(12) United States Patent
Peng et al.

(10) Patent No.: US 10,873,119 B2
(45) Date of Patent: Dec. 22, 2020

(54) FILTER AND WIRELESS NETWORK DEVICE

(71) Applicant: HUAWEI TECHNOLOGIES CO., LTD., Guangdong (CN)

(72) Inventors: Jie Peng, Xi'an (CN); Jian Hu, Xi'an (CN); Tao Tian, Shenzhen (CN); Zhen Shen, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 39 days.

(21) Appl. No.: 16/015,717

(22) Filed: Jun. 22, 2018

(65) Prior Publication Data

US 2018/0301781 A1  Oct. 18, 2018

Related U.S. Application Data

(63) Continuation of application No. PCT/CN2015/098673, filed on Dec. 24, 2015.

(51) Int. Cl.
*H01P 1/208* (2006.01)
*H01P 1/205* (2006.01)
(Continued)

(52) U.S. Cl.
CPC ............ *H01P 1/208* (2013.01); *H01P 1/2053* (2013.01); *H01P 5/02* (2013.01); *H01P 7/04* (2013.01); *H01P 7/06* (2013.01); *H04W 88/08* (2013.01)

(58) Field of Classification Search
CPC ........ H01P 1/2053; H01P 1/208; H01P 1/213; H01P 1/2138; H01P 1/2136; H01P 7/04
(Continued)

(56) References Cited

U.S. PATENT DOCUMENTS 4,761,625 A * 8/1988 Sharma ................. H01P 1/2016
                                                      333/209
7,952,452 B2   5/2011 Morga
(Continued)

FOREIGN PATENT DOCUMENTS

CN        201063353 Y    5/2008
CN        201084811 Y    7/2008
(Continued)

OTHER PUBLICATIONS

Chinese Office Action dated Mar. 5, 2019 in corresponding Chinese Patent Application No. 201580085536.0 (9 pages).
(Continued)

*Primary Examiner* — Rakesh B Patel
(74) *Attorney, Agent, or Firm* — Womble Bond Dickinson (US) LLP

(57) ABSTRACT

The filter is provided, which includes a filter body and resonant cavities disposed on the filter body, and further includes an input port and an output port that are disposed on the filter body. At least one of the input port or the output port is connected to a set of additional resonant cavities, and each set of additional resonant cavities includes: a first additional resonant cavity in signal coupling to the input port or the output port, and a second additional resonant cavity in signal coupling to the first additional resonant cavity. In the filter, the two additional resonant cavities and another resonant cavity connected to the input port or the output port are in a form of a straight line, thereby implementing a flexible layout of cavities of the filter. In addition, a coupling structure is simple, costs are low, reliability and batch consistency is good.

20 Claims, 3 Drawing Sheets

(51) Int. Cl.
*H01P 7/04* (2006.01)
*H01P 5/02* (2006.01)
*H01P 7/06* (2006.01)
*H04W 88/08* (2009.01)

(58) Field of Classification Search
USPC .............................. 333/202, 203, 208, 209
See application file for complete search history.

(56) References Cited

U.S. PATENT DOCUMENTS

| | | | | |
|---|---|---|---|---|
| 2004/0041661 | A1* | 3/2004 | Yamakawa | H01P 1/2084 333/134 |
| 2006/0220765 | A1* | 10/2006 | Muller | H01P 7/04 333/206 |
| 2006/0238275 | A1* | 10/2006 | Burger | H01P 1/2053 333/202 |
| 2012/0299668 | A1 | 11/2012 | Liu et al. | |
| 2014/0105090 | A1 | 4/2014 | Banerjea et al. | |

FOREIGN PATENT DOCUMENTS

| | | |
|---|---|---|
| CN | 101366240 A | 2/2009 |
| CN | 101626101 A | 1/2010 |
| CN | 102881975 A | 1/2013 |
| CN | 203218423 U | 9/2013 |
| CN | 103762402 A | 4/2014 |
| CN | 204303958 U | 4/2015 |
| CN | 105048041 A | 11/2015 |
| EP | 2556559 A1 | 2/2013 |
| JP | S61304 B2 | 1/1986 |
| JP | H10276008 A | 10/1998 |
| KR | 101191751 B1 | 10/2012 |
| WO | 2014039637 A1 | 3/2014 |

OTHER PUBLICATIONS

Cheng Zhang,"Design of Digital System-Circuit",Beihang University Press,dated Jan. 2014,total 5 pages with 2 pages English translation.

International Search Report dated Aug. 31, 2016 in corresponding International Patent Application No. PCT/CN2015/098673.

International Search Report dated Aug. 31, 2018 in corresponding International Patent Application No. PCT/CN2015/098673.

Tang Jian et al, Method for Extracting Input-output Coupling Coefficient of Cross-coupled Microwave Filter. Modern Electronics Technique, May 2009, 4 pages.

* cited by examiner

FILTER AND WIRELESS NETWORK DEVICE

CROSS-REFERENCE TO RELATED APPLICATIONS

This application is a continuation of International Application No. PCT/CN2015/098673, filed on Dec. 24, 2015, the disclosure of which is hereby incorporated by reference in its entirety.

TECHNICAL FIELD

The present invention relates to the field of communications technologies, and in particular, to a filter and a wireless network device.

BACKGROUND

With increasing development of wireless communications technologies, a wireless communications system imposes a higher requirement on performance of a base station. A filter plays an important role in the performance of the base station, and to reduce mutual interference between different communications systems, a cavity filter on the base station usually needs to have a relatively high outband suppression requirement. To achieve relatively strong suppression by a filter, a conventional method is to add cross coupling between non-neighboring resonant cavities (the non-neighboring resonant cavities are resonant cavities that are not neighboring to each other in a topology relationship) to generate a finite transmission zero.

Because the cross coupling is coupling between non-neighboring resonant cavities, and requires a physical distance between the non-neighboring resonant cavities to be very short, a relatively high requirement is imposed on a layout of cavities of the filter. However, currently, a quantity of channels of a filter on a base station system (especially, in a time division duplex (TDD) mode) becomes larger, and a higher requirement is imposed on a volume and an integration degree of the filter. Consequently, the layout of the filter is quite limited, and it is difficult to improve a suppression degree by using the cross coupling.

In the prior art, one manner is to directly or indirectly couple an additional resonant cavity to an input or output port of a ceramic dielectric cavity filter, so as to form a finite transmission zero. For example, one additional resonant cavity is directly coupled to the input port to form one finite transmission zero, and a frequency of the finite transmission zero is equal to a resonant frequency of the resonant cavity. Furthermore, one additional resonant cavity is directly coupled to the output port, and then, one additional resonant cavity is indirectly coupled to the output port by using a metal plate, to form two finite transmission zeroes, and frequencies of the two finite transmission zeroes are respectively resonant frequencies of the two resonant cavities. A location of the zero may be adjusted by adjusting a frequency of the additional resonant cavity, to satisfy different suppression requirements. However, in the foregoing solution, to form a plurality of finite transmission zeroes, the two additional resonant cavities both need to be coupled to the port, in other words, three resonant cavities are coupled to the ports. Consequently, a structure is complex, reliability is poor, and it is difficult to implement such indirect coupling when a size of the filter is relatively small. Furthermore, such indirect coupling needs a part that is relatively complex in both structure and mounting, and as a result, coupling consistency of the part is relatively poor, and there is a risk of reliability, not facilitating batch production.

SUMMARY

The present invention provides a filter and a base station, to improve a coupling effect of the filter.

According to a first aspect, a filter is provided. The filter includes a filter body and resonant cavities disposed on the filter body, where one resonator is disposed in each resonant cavity; and further includes: an input port and an output port that are disposed on the filter body, where the input port is inductively coupled to one of the resonant cavities, the output port is inductively coupled to another one of the resonant cavities, and neighboring resonant cavities are inductively coupled; and at least one of the input port or the output port is connected to a set of additional resonant cavities, and each set of additional resonant cavities includes: a first additional resonant cavity in signal coupling to the input port or the output port, and a second additional resonant cavity in signal coupling to the first additional resonant cavity.

With reference to the first aspect, in a first possible implementation, the resonant cavity connected to the input port and the set of additional resonant cavities connected to the input port are topologically arranged in a straight line, and/or the another resonant cavity connected to the output port and the set of additional resonant cavities connected to the output port are topologically arranged in a straight line.

With reference to the first aspect or the first possible implementation of the first aspect, in a second possible implementation, the resonant cavities disposed on the filter body include resonant cavities arranged in a straight line.

With reference to the first aspect, the first possible implementation of the first aspect, or the second possible implementation of the first aspect, in a third possible implementation, the first additional resonant cavity is inductively coupled to or capacitively coupled to the second additional resonant cavity.

With reference to any one of the first aspect or the first to third possible implementations of the first aspect, in a fourth possible implementation, the filter body includes: a groove body and a cover covering and fastened to the groove body, the plurality of resonant cavities, the first additional resonant cavity, and the second additional resonant cavity are disposed in the groove body, and neighboring cavities are isolated by a cavity wall.

With reference to the fourth possible implementation of the first aspect, in a fifth possible implementation, the cavity wall between the resonant cavities is provided with a first coupling window, and the neighboring resonant cavities are inductively coupled by using the first coupling window.

With reference to any one of the first aspect or the first to fifth possible implementations of the first aspect, in a sixth possible implementation, the first additional resonant cavity is inductively coupled to the second additional resonant cavity, a cavity wall between the first additional resonant cavity and the second additional resonant cavity is provided with a second coupling window, and the first additional resonant cavity is inductively coupled to the second additional resonant cavity by using the second coupling window.

With reference to the sixth possible implementation of the first aspect, in a seventh possible implementation, the filter further includes coupling bolts corresponding to each first coupling window and each second coupling window, where the coupling bolts are threadedly connected to the cover and inserted into the coupling windows corresponding to the coupling bolts.

With reference to any one of the first aspect or the first to fifth possible implementations of the first aspect, in an eighth possible implementation, the first additional resonant cavity is capacitively coupled to the second additional resonant cavity, a cavity wall between the first additional resonant cavity and the second additional resonant cavity is provided with a dielectric holder, a dumbbell-shaped metal pole is clamped on the dielectric holder, and the first additional resonant cavity is capacitively coupled to the second additional resonant cavity by using the metal pole.

With reference to any one of the first aspect or the first to eighth possible implementations of the first aspect, in a ninth possible implementation, a cavity wall between the first additional resonant cavity and a neighboring resonant cavity is provided with a notch, a coupling connection structure is disposed in the notch, and the input port and/or the output port is in signal coupling to the first additional resonant cavity and the resonant cavity neighboring to the first additional resonant cavity by using the coupling connection structure.

With reference to the ninth possible implementation of the first aspect, in a tenth possible implementation, the input port is a coaxial connector, the coupling connection structure includes a metal cylinder disposed in the notch and two step structures fixedly connected to the metal cylinder, an inner core of the coaxial connector is in signal connection to the metal cylinder, one of the step structures is connected to a resonator located in the first additional resonant cavity, and the other step structure is connected to a resonator located in the resonant cavity neighboring to the first additional resonant cavity.

With reference to any one of the first aspect or the first to tenth possible implementations of the first aspect, in an eleventh possible implementation, the input port is disposed on the cover, and the output port is disposed on a side wall of the groove body; or the input port and the output port are both disposed on a side wall of the groove body.

With reference to any one of the first aspect or the first to eleventh possible implementations of the first aspect, in a twelfth possible implementation, the first additional resonant cavity, the second additional resonant cavity, and the plurality of resonant cavities are arranged in a straight line.

With reference to any one of the first aspect or the first to twelfth possible implementations of the first aspect, in a thirteenth possible implementation, the filter is a metal coaxial cavity filter.

According to a second aspect, a wireless network device is provided. The wireless network device includes the filter according to any one of the foregoing implementations.

The wireless network device may be a base station, or a terminal, or a device in a microwave system.

According to the filter provided in the first aspect and the wireless network device provided in the second aspect, a flexible layout of cavities of the filter can be implemented. In addition, two additional resonant cavities are connected in series to the input port and/or the output port of the filter, the first additional resonant cavity is coupled to the input port or the output port, and the second additional resonant cavity is inductively coupled to or capacitively coupled to the first additional resonant cavity, so that a coupling structure is simple, costs are low, reliability is good, and batch consistency is good.

REFERENCE NUMERALS

Figure 1:
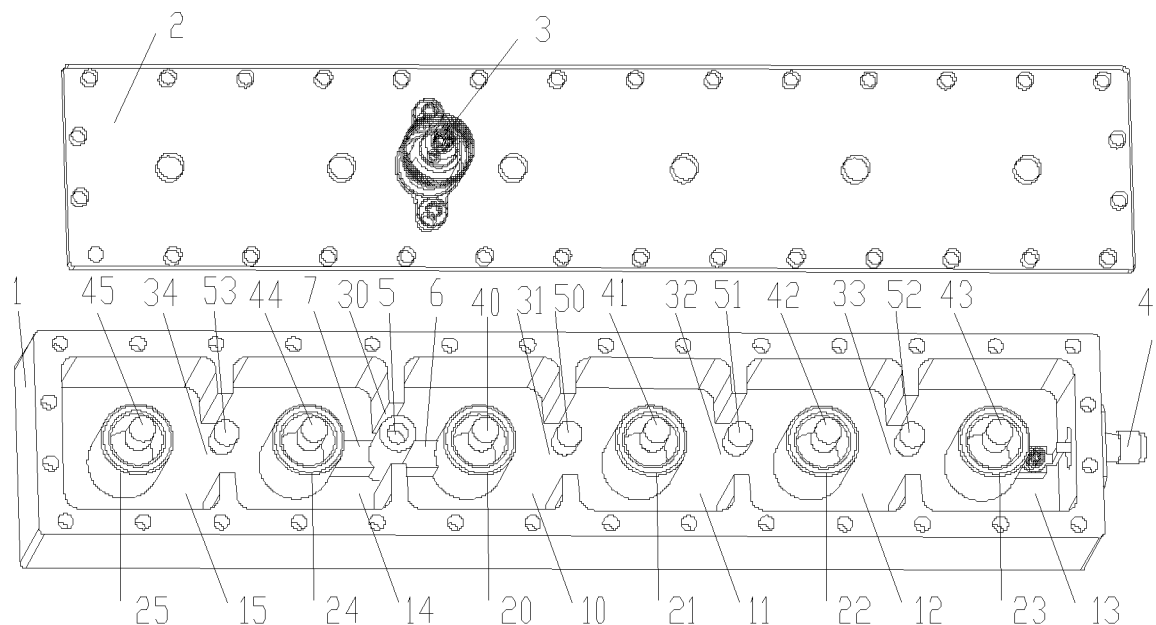
FIG. 1 is a schematic exploded view of a filter according to an embodiment of the present invention.

1: Groove body; 2: Cover body; 3: Input port; 4: Output port;
5: Metal cylinder; 6 and 7: Protrusion; 10 to 15: Resonant cavity;
20 to 25: Resonant column; 30: Notch; 31, 32, and 33: First coupling window;
34: Second coupling window; 40 to 45: Tuning screw; 50 to 53: Coupling bolt;
100: Transmission response curve; 110 and 111: Transmission zero;
200: Groove body; 210: Input port; 211: Coaxial connector inner core;
220: First additional resonant cavity; 230: Resonator; 240: Silver-plated wire or metal plate;
250: Resonant cavity; 260: First resonant cavity; 300: Groove body;
311: Second additional resonant cavity; 310: First additional resonant cavity; 320: First resonator;
321: Second resonator; 330: Metal pole; 340: Dielectric holder; 350: Window

DESCRIPTION OF EMBODIMENTS

The following describes specific embodiments of the present invention in detail with reference to the accompanying drawings.

An embodiment of the present invention provides a filter. The filter includes a filter body and resonant cavities disposed on the filter body, where one resonator is disposed in each resonant cavity; and further includes: an input port and an output port that are disposed on the filter body.

The input port and the output port are respectively inductively coupled to resonant cavities located at two ends, and neighboring resonant cavities are inductively coupled.

At least one of the input port or the output port is connected to a set of additional resonant cavities, and each set of additional resonant cavities includes: a first additional resonant cavity in signal coupling to the input port or the output port, and a second additional resonant cavity in signal coupling to the first additional resonant cavity.

In the foregoing embodiment, a topology structure of the provided filter is in a form of a straight line, so that a flexible layout of cavities of the filter can be implemented. In addition, two additional resonant cavities are connected in series to the input port and/or the output port of the filter, the first additional resonant cavity is coupled to the input port or the output port, and the second additional resonant cavity is inductively coupled to or capacitively coupled to the first additional resonant cavity, so that a coupling structure is simple, costs are low, reliability is good, and batch consistency is good.

To help understand a structure of the filter provided in this embodiment of the present invention, the following describes in detail the structure of the filter with reference to the specific accompanying drawings.

In this embodiment, there is no essential difference in structure between an additional resonant cavity and other normal resonant cavities. In terms of the topology structure, a normal resonant cavity is located between two ports (the input port and the output port), and the additional resonant cavity is a resonant cavity located at an outside of one port. Additional resonant cavities may be disposed by using the following different combination manners: The input port is connected in series to a set of additional resonant cavities, the output port is connected in series to a set of additional resonant cavities, or each of the input port and the output port is connected in series to a set of additional resonant cavities. For ease of description, a description is provided by using an example in which the input port is connected in series to a set of additional resonant cavities.

When the additional resonant cavities are specifically disposed, disposing locations of two resonant cavitys of the additional resonant cavities may be set according to demands. Two additional resonant cavities and another resonant cavity connected to the input port (or the output port) connected to the two additional resonant cavities may be arranged in a straight line, and a specific arrangement manner of other resonant cavities is not limited. The following gives a description by using an example in which two additional resonant cavities and the other resonant cavities are arranged in a straight line.

As shown in FIG. 1, the filter provided in this embodiment is a multi-zero filter. In a topology structure of the multi-zero filter, another resonant cavity connected to an input port and a set of additional resonant cavities connected to the input port are topologically arranged in a straight line, and/or another resonant cavity connected to an output port and a set of additional resonant cavities connected to the output port are topologically arranged in a straight line. For ease of description, this embodiment is described by using a metal coaxial cavity filter as an example. Resonant cavities disposed on a filter body of the metal coaxial cavity filter include resonant cavities arranged in a straight line. There may be a plurality of resonant cavitys of the filter. For ease of description, this embodiment is described by using six resonant cavitys as an example, and a resonator is disposed in each resonant cavity.

Specifically, the filter body of the filter includes a groove body 1 and a cover 2 covering and fastened to the groove body 1. Six resonant cavities 10 to 15 arranged in a straight line are disposed inside the groove body 1, and one resonator is disposed in each resonant cavity. The plurality of resonant cavities 10 to 15 of the filter are formed by disposing a plurality of vertical cavity walls inside the groove body 1 to divide a cavity of the groove body 1 into a plurality of sub-areas, and one cavity wall exists between two neighboring resonators (the neighboring resonators are resonators in neighboring resonant cavities in a topology relationship), in other words, the neighboring cavities are isolated by the cavity wall. The resonant cavity 14 located at an end portion is a first additional resonant cavity, and the resonant cavity 15 is a second additional resonant cavity. The term coaxial in the coaxial cavity filter refers to: Axes of the first additional resonant cavity, the second additional resonant cavity, and four resonant cavities are a same axis. In other words, the first additional resonant cavity, the second additional resonant cavity, and the plurality of resonant cavities are arranged in a straight line.

An input port 3 and an output port 4 may be disposed at different locations. For example, the input port 3 is disposed on the cover, and the output port 4 is disposed on a side wall of the groove body 1; or the input port 3 and the output port 4 are both disposed on a side wall of the groove body 1; or the input port 3 is disposed on a bottom surface of the groove body 1, and the output port 4 is disposed on a side wall of the groove body 1. The input port 3 is used to connect to the outside for input, and the output port 4 is used to connect to the outside for output. Connection manners of the input port 3 and the output port 4 are the same as connection manners of a filter in the prior art, and details are not described herein.

In the foregoing embodiment, a resonator is disposed in each resonant cavity. In other words, one resonator is disposed in each resonant cavity, and a resonator is disposed in each of the first additional resonant cavity and the second additional resonant cavity. The resonators may be different resonators, and the resonators may include resonant columns 20 to 25 vertically standing at a bottom portion of the groove body 1 and tuning screws 40 to 45 disposed above the resonant columns. The resonant columns 20 to 25 may be integrally manufactured with the groove body 1, or may be independently manufactured and then fastened to the groove body 1 by using screws. The tuning screws 40 to 45 are connected to the cover 2. Specifically, the cover 2 is provided with threaded holes fitting with the tuning screws 40 to 45, and the tuning screws 40 to 45 are threadedly connected to the cover 2. In addition, the resonators provided in this embodiment may alternatively use another structure. To be specific, the resonators 10 to 15 may not be provided with the resonant columns 20 to 25. In this case, the resonant cavities 10 to 15 are pure air cavities.

In this embodiment, the resonant cavities 10 to 15 are inductively coupled to each other. Specifically, cavity walls between the resonant cavities 10 to 13 are provided with first coupling windows 31 to 33, and neighboring resonant cavities 10 to 13 are inductively coupled by using the first coupling windows 31 to 33. A part of the cavity wall is removed, and then, the first coupling window between two neighboring resonant cavities associated by the cavity wall is formed, thereby implementing a signal connection. A signal connection manner between the first additional resonant cavity and the second additional resonant cavity may use different manners. Either inductive coupling or capacitive coupling may be used. No difference in electric performance exists between the two coupling manners under same coupling strength. The inductive coupling is physically implemented by using a window, and the capacitive coupling is physically implemented by using a metal pole and a dielectric holder. The inductive coupling is more easily implemented.

Figure 4:
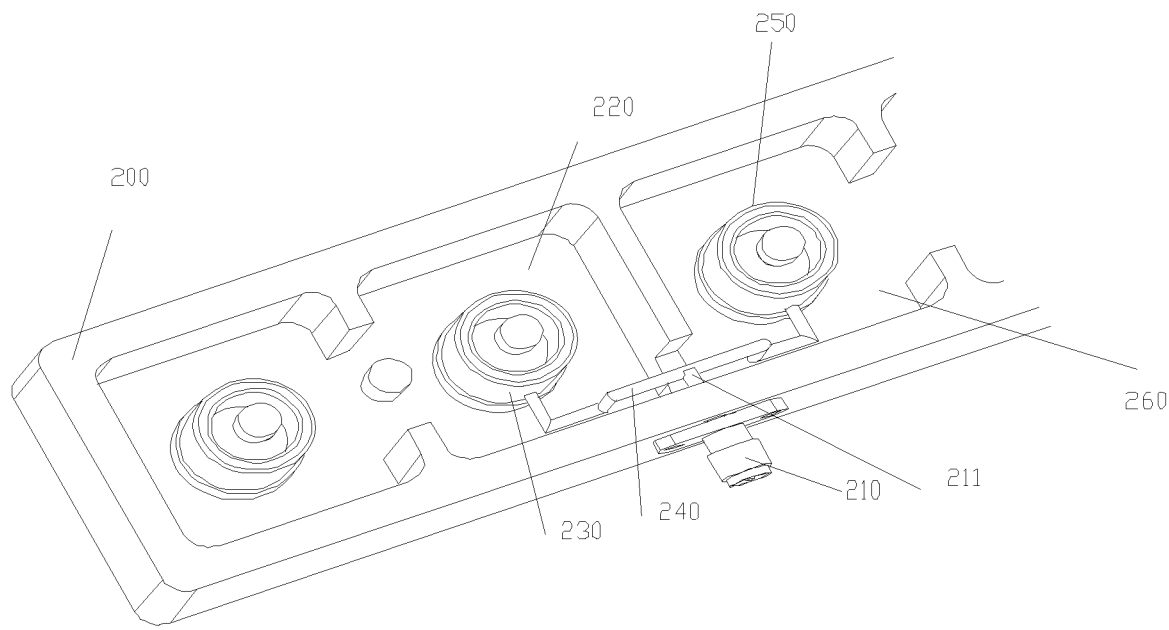
FIG. 4 is a schematic setting diagram of an input port of a filter according to an embodiment of the present invention.

Referring to FIG. 1 and FIG. 4, when the first additional resonant cavity is inductively coupled to the second additional resonant cavity, a cavity wall between the first additional resonant cavity and the second additional resonant cavity is provided with a second coupling window 34, and the first additional resonant cavity is inductively coupled to the second additional resonant cavity by using the second coupling window 34. In a specific disposing manner, a part of the cavity wall between the first additional resonant cavity and the second additional resonant cavity is removed, and then, the coupling window between the first additional resonant cavity and the second additional resonant cavity that are associated by the cavity wall is formed, thereby implementing signal transmission between the first additional resonant cavity and the second additional resonant cavity.

When a plurality of resonant cavities are inductively coupled, a coupling resonant cavity between resonant cavitys may be adjusted in different manners, for example, by adjusting a size of a coupling window. The coupling window includes the first coupling windows 31 to 33 and the second coupling window 34. Alternatively, coupling bolts 50 to 53 are correspondingly disposed for each first coupling window and each second coupling window, and the coupling bolts are threadedly connected to the cover 2 and inserted into the coupling windows corresponding to the coupling bolts. Specifically, the corresponding coupling bolts 50 to 53 are disposed above centers of the coupling windows (the first coupling windows 31 to 33 and the second coupling window 34), and coupling strength of a signal may be adjusted by adjusting a depth by which the coupling bolt extends into the cavity. Threaded holes for locking the coupling bolts 50 to 53 are disposed at corresponding locations on the cover 2. The coupling bolts 50 to 53 are threadedly locked to the threaded holes on the cover 2, to fasten the coupling bolts 50 to 53 to the cover 2 and suspend the coupling bolts 50 to 53 above the corresponding resonant columns and coupling windows. In addition, top portions of the coupling bolts extend out of an outer surface of the cover 2, so that coupling can be adjusted by rotating the bolts from the outside of the cavity.

Figure 5:
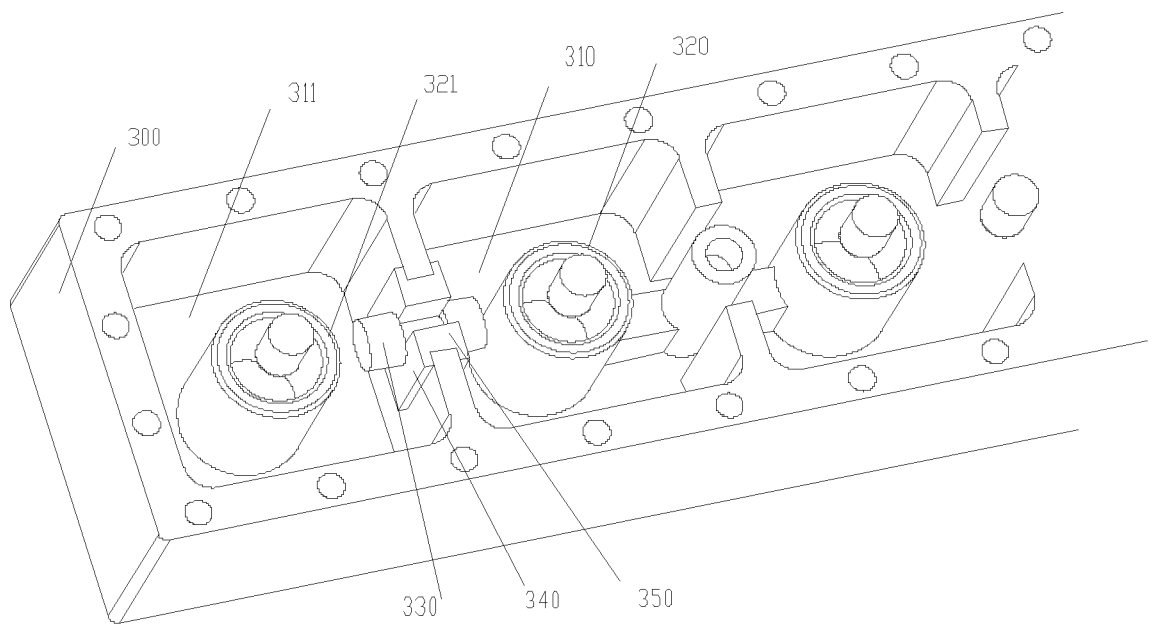
FIG. 5 is a schematic coupling diagram of a first additional resonant cavity and a second additional resonant cavity of a filter according to an embodiment of the present invention.

Referring to FIG. 1 and FIG. 5, when the first additional resonant cavity is capacitively coupled to the second additional resonant cavity, the cavity wall between the first additional resonant cavity and the second additional resonant cavity is provided with a dielectric holder 340, a dumbbell-shaped metal pole 330 is clamped on the dielectric holder 340, and the first additional resonant cavity is capacitively coupled to the second additional resonant cavity by using the metal pole 330. A specific implementation is shown in FIG. 5. One end of a groove body 300 is provided with a first additional resonant cavity 310 and a second additional resonant cavity 311. A first resonator 320 is disposed in the first additional resonant cavity 310, and a second resonator 321 is disposed in the second additional resonant cavity 311. A cavity wall is disposed between the first additional resonant cavity 310 and the second additional resonant cavity 311, and the cavity wall is provided with a window 350. During specific mounting, the dumbbell-shaped metal pole 330 is clamped on the dielectric holder 340, and then, the metal pole 330 and the dielectric holder 340 are integrally mounted on the window 350 of the cavity wall. The metal pole 330 is not in direct contact with the groove body 300. In addition, during specific disposing, a shorter distance between the metal pole 330 and the first resonator 320 and the second resonator 321 indicates stronger capacitive coupling. Therefore, coupling strength of the first additional resonant cavity 310 and the second additional resonant cavity 311 may be adjusted by using the distance between the metal pole 330 and the resonant cavity.

It should be understood that when the output port is connected to a set of additional resonant cavities, a connection manner is the same as a connection manner of the input port and the additional resonant cavities. In this embodiment, a description is provided by using an example in which the input port is connected to a set of additional resonant cavities.

The input port provided in this embodiment may be disposed in different locations, in other words, may be disposed on the cover, or may be disposed on the groove body. As shown in FIG. 1, when the input port 3 is disposed on the cover 2, a cavity wall between the first additional resonant cavity and a neighboring resonant cavity is provided with a notch 30, a coupling connection structure is disposed in the notch 30, and the input port 3 is in signal coupling to the first additional resonant cavity and the resonant cavity neighboring to the first additional resonant cavity by using the coupling connection structure. Specifically, the input port 3 may be a coaxial connector, and the coupling connection structure includes a metal cylinder 5 disposed in the notch 30 and two step structures 6 and 7 fixedly connected to the metal cylinder 5. An inner core of the coaxial connector is in signal connection to the metal cylinder 5, one of the step structures is connected to a resonator located in the first additional resonant cavity, and the other step structure is connected to a resonator located in the resonant cavity neighboring to the first additional resonant cavity. That is, the input port 3 is separately in signal coupling to the resonator 40 and the resonator 44 by using the inner core of the input port 3 and the coupling structure (the metal cylinder 5 and the step 6 and the step 7 that are connected to the metal cylinder 5) in the cavity, and during specific manufacturing, the metal cylinder 5, the steps 6 and 7, and the grove body 1 may be integrally manufactured.

As shown in FIG. 4, when an input port 310 is disposed on a side surface of a groove body 200, coupling between the input port 310 and a first additional resonant cavity 220 may be implemented by connecting a silver-plated wire or a metal plate 240 and a coaxial connector inner core 211. Specifically, the silver-plated wire or the metal plate 240 is separately connected to the coaxial connector inner core 211, a resonator 230 located in the first additional resonant cavity 220, and a resonator 250 located in a first resonant cavity 260.

It may be learned from the foregoing description that coupling between the input port and the resonant cavities may be implemented by using different structures.

Figure 2:
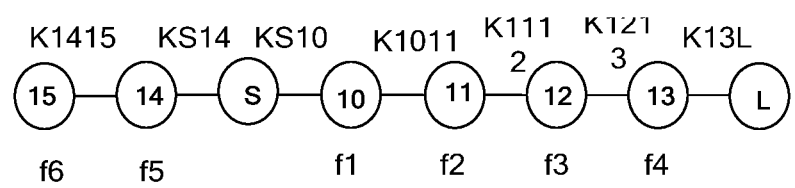
FIG. 2 is a schematic topology diagram of a filter according to an embodiment of the present invention.

During use of the filter provided in this embodiment, as shown in FIG. 2, S represents an input port, L represents an output port, 10, 11, 12, and 13 represent resonant cavities, 14 and 15 represent additional resonant cavities, and K1415, K14S, KS10, K1011, K1112, K1213, and K13L represent coupling relationships. In the filter in this embodiment, a radio frequency signal enters from the input port 3. On one hand, the radio frequency signal is output through the resonant cavities 10, 11, 12, and 13 and the output port 4; on the other hand, the resonant cavities 14 and 15 are used as additional resonant cavities, the radio frequency signal is reflected by the additional resonant cavities, and a transmission zero is generated on a left side and a right side of a passband of the radio frequency signal. No direct electromagnetic action is generated between the resonant cavity 15 and the resonant cavities 10 to 13 other than the resonant cavity 14. A coupling topology structure of the filter is shown in FIG. 1, and is topologically presented in a form of a straight line. By using the coupling structure, a finite transmission zero is separately formed above and below the passband, so as to improve an outband suppression characteristic of the filter.

Figure 3:
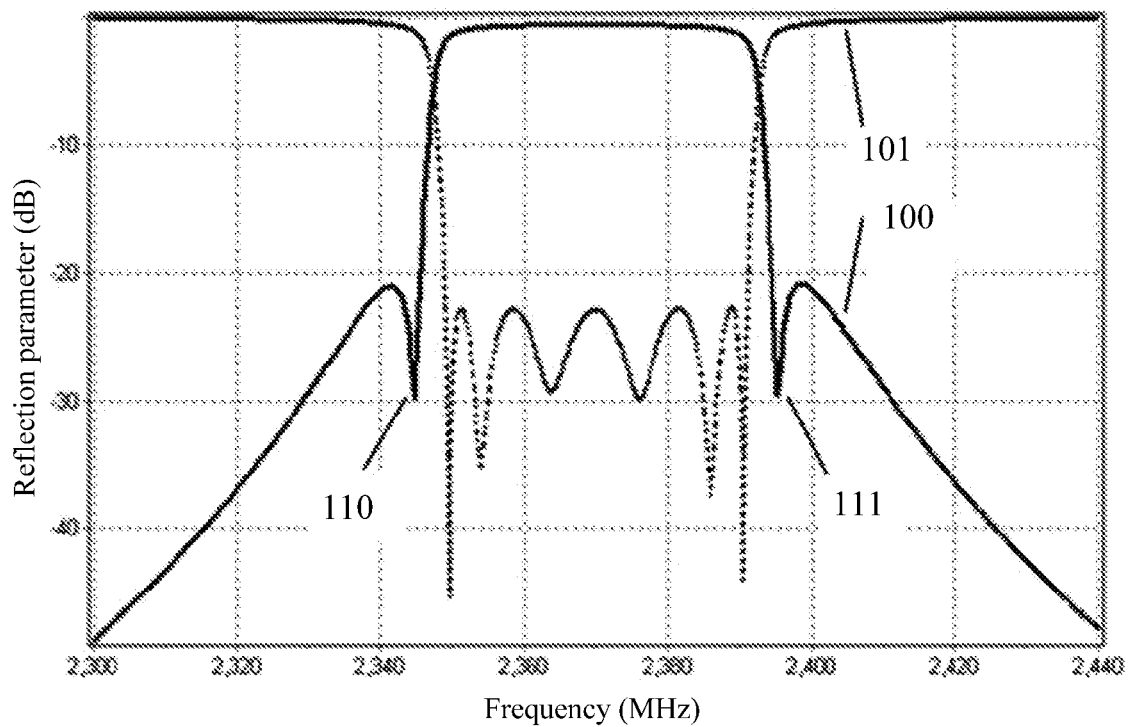
FIG. 3 is a schematic diagram of a frequency domain response of a filter according to an embodiment of the present invention.

FIG. 3 shows a frequency response curve of a filter. 100 represents a transmission response curve, and 110 and 111 represent two transmission zeroes formed by using this coupling form. Distances between the two transmission zeroes and a center of the passband are determined by the coupling strength K1415 between the additional resonant cavity 14 and the additional resonant cavity 15 and resonant frequencies of the additional resonant cavity 14 and the additional resonant cavity 15. Smaller coupling strength K1415 between the additional resonant cavity 14 and the additional resonant cavity 15 indicates a smaller frequency separation between the two transmission zeroes, in other words, the two transmission zeroes are closer to the center of the passband. Larger coupling strength K1415 between the additional resonant cavity 14 and the additional resonant cavity 15 indicates a larger frequency separation between the two transmission zeroes, in other words, the two transmission zeroes are away from the center of the passband. Impacts of the resonant frequencies of the additional resonant cavity 14 and the additional resonant cavity 15 on the transmission zeros are similar. When the resonant frequency becomes lower, the two transmission zeros both move to a low frequency; and when the resonant frequency becomes higher, the two transmission zeros both move to a high frequency. By using the coupling between the two additional resonant cavities and impact characteristics of the frequencies of the two additional resonant cavities on the transmission zeroes, a strong, weak, symmetrical, or asymmetrical layout of the zeroes can be implemented flexibly, satisfying different suppression requirements. Usually, the two additional resonant cavities 14 and 15 resonate near a center frequency, and in this case, the two generated transmission zeroes are approximately symmetrical around the center of the passband.

In an actual application, locations of the two required transmission zeroes and the coupling K1415 between the resonant cavity 14 and the resonant cavity 15 are determined according to different outband suppression requirements. The coupling K1415 may be adjusted in a large range by changing a size of the second coupling window 34, or may be adjusted in a small range by adjusting the coupling bolt 53. In this embodiment, such coupling structure of the window implements electromagnetic coupling in which a magnetic field is dominant, and total coupling is magnetic field coupling (also referred to as inductive coupling) minus electric field coupling (also referred to as capacitive coupling). A magnetic field of a location in the resonant cavity closer to a bottom portion of a resonant column is larger, and an electric field of a location closer to a top portion of the resonant column is larger. When the size of the window is increased, an increase of the magnetic field coupling is greater than an increase of the electric field coupling. Therefore, the total coupling is increased. When the coupling bolt 53 extends more deeply into the cavity, the electric field is blocked by the coupling bolt 53 and the coupling is weaker, and the total coupling is increased, and vice versa. Therefore, when the second coupling window 34 is larger or the coupling bolt 53 extends more deeply into the cavity, the coupling K1415 is greater, the two zeroes are farther away from the center of the passband, and usually, near band suppression of the passband is stronger, and vice versa.

In addition, in this embodiment, the two additional resonant cavities may be placed at the input port, or may be placed at the output port, or each of the input port and the output port is connected in series to two additional resonant cavities, to form four finite transmission zeroes. An adjusting manner is the same as the foregoing manner, and details are not described herein again.

As shown in FIG. 1 and FIG. 3, the input port 3 of the filter is connected in series to two additional resonant cavities 14 and 15, to form a coupling topology structure in a form of a straight line. Transmission zeroes 110 and 111 may be separately formed above and below the passband of the filter, so as to improve an outband suppression characteristic of the filter. Strength of the transmission zero may be adjusted by adjusting the coupling K1415 between the additional cavity 14 and the additional cavity 15. When the coupling is weaker, the implemented zero is stronger, and a near band outband suppression characteristic is better. Relatively weak coupling is relatively easily implemented. Therefore, by using the technical solution, a straight cavity layout and a strong near band outband suppression characteristic can be easily implemented, satisfying a requirement of a base station for a high suppression scenario of a filter.

As shown in FIG. 1, the coupling between the input port 3 and the resonant cavity 14 is implemented by the coaxial connector inner core acting with the metal cylinder 5 and the step 7 in the cavity, and the coupling between the resonant cavity 15 and the resonant cavity 14 is implemented in a form of window coupling. The two coupling implementation forms are quite mature, a structure is simple, costs are low, reliability is good, and consistency is good, being suitable for batch production.

Compared with the prior art, a main improvement of the foregoing embodiment is that in the topology structure, the two additional resonant cavities and the another resonant cavity connected to the input port (or the output port) connected to the two additional resonant cavities are arranged in a straight line. Based on a premise that two transmission zeroes are implemented, any resonant cavity may be directly coupled to only two nodes (a port or a resonant cavity), and therefore, a layout of the cavities is quite flexible. In addition, two relatively strong finite transmission zeroes may be implemented under weaker coupling, satisfying a strong near band suppression requirement of the filter of the base station. Furthermore, a structure form of the technical solution is simple, costs are low, reliability is good, and batch consistency is good.

It can be learned from the foregoing description that in the filter provided in this embodiment, the input port and/or the output port is connected in series to two additional resonant cavities, the first additional resonant cavity is coupled to the input port and/or the output port, and the second additional resonant cavity is coupled to the first additional resonant cavity, so that one finite transmission zero may be separately formed above and below the passband of the filter, thereby improving the outband suppression characteristic of the filter. The strength of the zero may be adjusted by using coupling between additional cavities, so that a relatively strong finite transmission zero can be implemented under relatively weak coupling, satisfying a high near band outband suppression requirement of the filter. In the technical solution, the topology structure of the filter is in a form of a straight line, so that a flexible layout of the cavities of the filter can be implemented. In addition, the coupling structure is easily implemented, costs are low, reliability is good, and batch consistency is good.

It should be understood that in specific embodiments of the present invention, only a coupling implementation form of the metal coaxial cavity filter is described. A person skilled in the art may apply the coupling implementation form to a dielectric TE (transverse electric) mode, a dielectric TM (transverse magnetic) mode, or a waveguide filter according to a specific application need, and a principle thereof is similar to a principle of the metal coaxial cavity filter. A form slightly modified by a technician also falls within the protection scope of the claims of the embodiments.

An embodiment of the present invention further provides a wireless network device. The wireless network device includes the filter according to any one of the foregoing embodiments. For example, the wireless network device may be a base station, or may be a terminal, or may be another wireless network device such as a device needing to use a filter in a network such as GSM, UMTS, LTE, or 5G, or may be a device needing to use a filter in a microwave system. This is not limited herein.

Figure 6:
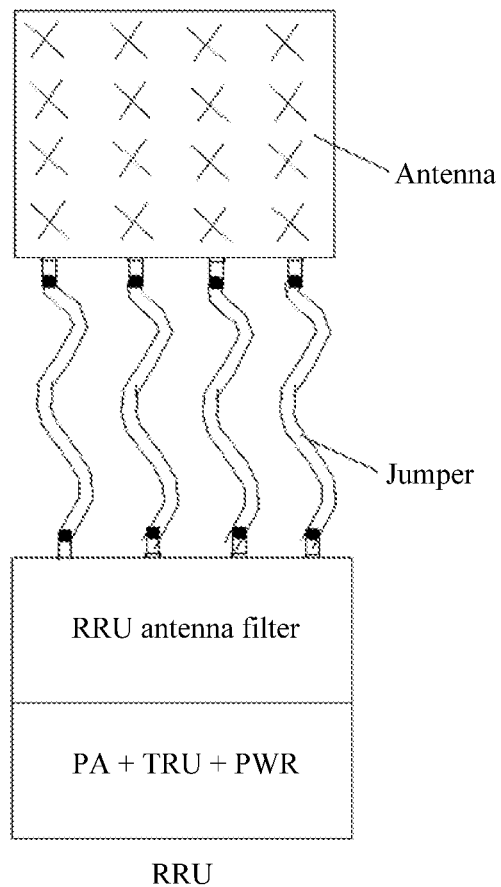
FIG. 6 is a schematic structural diagram of a base station according to an embodiment of the present invention.

Specifically, for example, the wireless network device is a base station. An optional structure of the base station is shown in FIG. 6. An RRU (remote radio unit) of the base station is connected to an antenna by using a jumper. The RRU includes a PA (power amplifier)+TRU (transceiver unit)+PWR (power supply) module and a filter. The filter is located at a front end of the RRU in a wireless communications base station system, and a function of the filter is to pass a desired signal of the system, and to filter out an undesired signal or a harmful signal of the system. In this communications system, the filter filters out a stray signal generated by the PA, to avoid interference with another system, and filters out an interference signal received by the antenna, to avoid impact on performance of the system. In the filter, the input port and/or the output port is connected in series to two additional resonant cavities, the first additional resonant cavity is coupled to the input port and/or the output port, and the second additional resonant cavity is coupled to the first additional resonant cavity, so that one finite transmission zero may be separately formed above and below a passband of the filter, thereby improving an outband suppression characteristic of the filter. Strength of the zero may be adjusted by using coupling between additional cavities, so that a relatively strong finite transmission zero can be implemented under relatively weak coupling, satisfying a high near band outband suppression requirement of the filter. In the topology structure of the filter in the technical solution, the two additional resonant cavities and another resonant cavity connected to the input port (or the output port) connected to the two additional resonant cavities are arranged in a straight line, so that a flexible layout of the cavities of the filter can be implemented. In addition, the coupling structure is easily implemented, costs are low, reliability is good, and batch consistency is good, thereby improving the structure of the filter, and improving a signal transmission effect of the wireless network device.

Obviously, a person skilled in the art can make various modifications and variations to the present invention without departing from the spirit and scope of the present invention. The present invention is intended to cover these modifications and variations of the present invention provided that they fall within the scope the claims and their equivalent technologies.

What is claimed is:

1. A filter, comprising:
a filter body with a straight-line groove body, and resonant cavities disposed in the straight-line groove body of the filter body, wherein one resonator is disposed in each of the resonant cavities;
a cover fastened to the straight-line groove body;
an input port and an output port, the input port disposed on the cover, and the output port disposed on the filter body, wherein the input port is inductively coupled to one of the resonant cavities, the output port is inductively coupled to another one of the resonant cavities, and neighboring resonant cavities are inductively coupled; and wherein at least one of the input port or the output port is connected to a set of additional resonant cavities, and the set of additional resonant cavities comprises: a first additional resonant cavity coupled to the input port or the output port, and a second additional resonant cavity in signal coupling to the first additional resonant cavity.

2. The filter according to claim 1, wherein the one of the resonant cavities inductively coupled to the input port and the set of additional resonant cavities connected to the input port are topologically arranged in a straight line, and/or the another one of the resonant cavities inductively coupled to the output port and the set of additional resonant cavities connected to the output port are topologically arranged in a straight line.

3. The filter according to claim 1, wherein the resonant cavities disposed on the filter body comprise resonant cavities arranged in a straight line.

4. The filter according to claim 1, wherein the first additional resonant cavity is inductively coupled to or capacitively coupled to the second additional resonant cavity.

5. The filter according to claim 1, wherein the first additional resonant cavity and the second additional resonant cavity are disposed in the straight-line groove body, and the neighboring resonant cavities are isolated by a cavity wall.

6. The filter according to claim 5, wherein the cavity wall between the neighboring resonant cavities is provided with a first coupling window, and the neighboring resonant cavities are inductively coupled by using the first coupling window.

7. The filter according to claim 6, wherein the first additional resonant cavity is inductively coupled to the second additional resonant cavity, another cavity wall between the first additional resonant cavity and the second additional resonant cavity is provided with a second coupling window, and the first additional resonant cavity is inductively coupled to the second additional resonant cavity by using the second coupling window.

8. The filter according to claim 7, further comprising coupling bolts corresponding to each first coupling window and the second coupling window, wherein the coupling bolts are threadedly connected to the cover and inserted into the coupling windows corresponding to the coupling bolts.

9. The filter according to claim 1, wherein the first additional resonant cavity is capacitively coupled to the second additional resonant cavity, a cavity wall between the first additional resonant cavity and the second additional resonant cavity is provided with a dielectric holder, a dumbbell-shaped metal pole is clamped on the dielectric holder, and the first additional resonant cavity is capacitively coupled to the second additional resonant cavity by using the metal pole.

10. The filter according to claim 1, wherein a cavity wall between the first additional resonant cavity and a neighboring resonant cavity is provided with a notch, a coupling connection structure is disposed in the notch, and the input port and/or the output port is in signal coupling to the first additional resonant cavity and the resonant cavity neighboring the first additional resonant cavity by using the coupling connection structure.

11. The filter according to claim 10, wherein the input port is a coaxial connector, the coupling connection structure comprises a metal cylinder disposed in the notch and two step structures fixedly connected to the metal cylinder, an inner core of the coaxial connector is in signal connection to the metal cylinder, one of the step structures is connected to the resonator located in the first additional resonant cavity, and the other step structure is connected to the resonator located in the resonant cavity neighboring the first additional resonant cavity.

12. The filter according to claim 1, wherein the output port is disposed on a side wall of the straight-line groove body.

13. The filter according to claim 1, wherein the first additional resonant cavity, the second additional resonant cavity, and the plurality of resonant cavities are arranged in a straight line.

14. The filter according to claim 1, wherein the filter is a metal coaxial cavity filter.

15. A wireless network device, comprising a filter, which comprises
- a filter body with a straight-line groove body, and resonant cavities disposed in the straight-line groove body of the filter body, wherein one resonator is disposed in each of the resonant cavities;
- a cover fastened to the straight-line groove body;
- an input port and an output port, the input port disposed on the cover, and the output port disposed on the filter body, wherein the input port is inductively coupled to one of the resonant cavities, the output port is inductively coupled to another one of the resonant cavities, and neighboring resonant cavities are inductively coupled; and wherein at least one of the input port or the output port is connected to a set of additional resonant cavities, and the set of additional resonant cavities comprises: a first additional resonant cavity coupled to the input port or the output port, and a second additional resonant cavity in signal coupling to the first additional resonant cavity.

16. The device according to claim 15, wherein the one of the resonant cavities inductively coupled to the input port and the set of additional resonant cavities connected to the input port are topologically arranged in a straight line, and/or the another one of the resonant cavities inductively coupled to the output port and the set of additional resonant cavities connected to the output port are topologically arranged in a straight line.

17. The device according to claim 15, wherein the resonant cavities disposed on the filter body comprise resonant cavities arranged in a straight line.

18. The device according to claim 15, wherein the first additional resonant cavity is inductively coupled to or capacitively coupled to the second additional resonant cavity.

19. The device according to claim 15, wherein the first additional resonant cavity and the second additional resonant cavity are disposed in the straight-line groove body, and the neighboring resonant cavities are isolated by a cavity wall.

20. The device according to claim 15, wherein the cavity wall between the neighboring resonant cavities is provided with a first coupling window, and the neighboring resonant cavities are inductively coupled by using the first coupling window.

* * * * *